May 10, 1932.  J. OLIPHANT  1,857,393
PUMPING MECHANISM
Original Filed March 24, 1924  4 Sheets-Sheet 1

Inventor:
John Oliphant.
by
Attorney.

May 10, 1932. J. OLIPHANT 1,857,393

PUMPING MECHANISM

Original Filed March 24, 1924 4 Sheets-Sheet 2

May 10, 1932.  J. OLIPHANT  1,857,393
PUMPING MECHANISM
Original Filed March 24, 1924    4 Sheets-Sheet 3
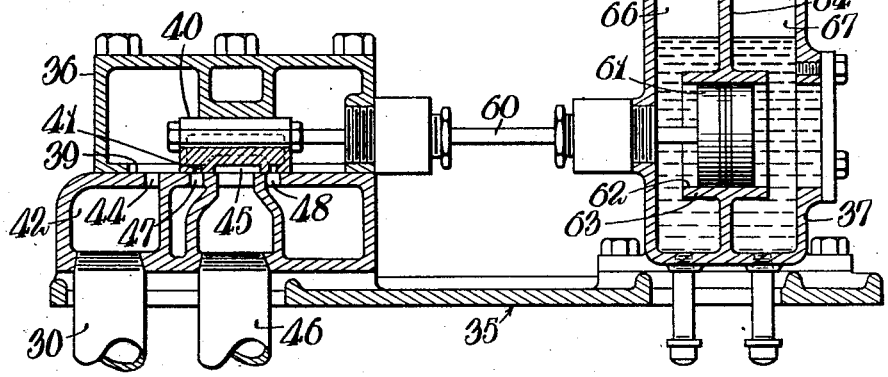
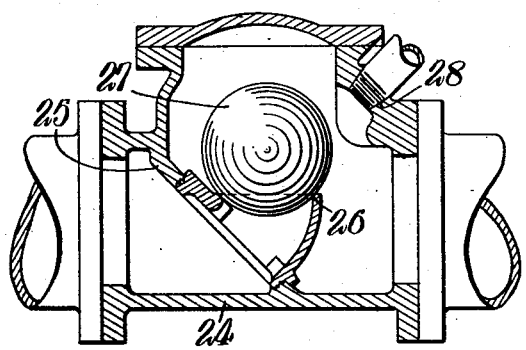
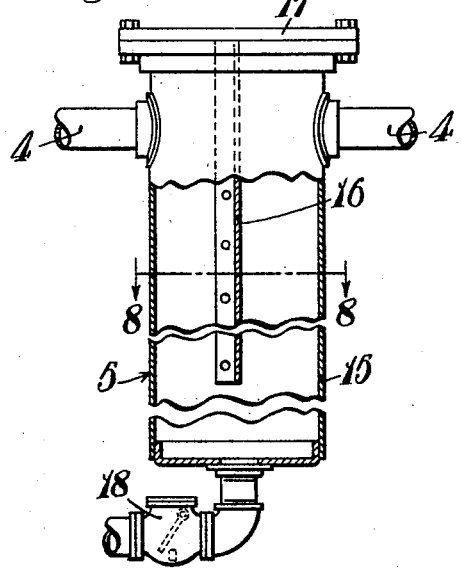
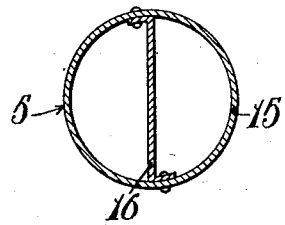
Inventor:
John Oliphant.
by
Attorney.

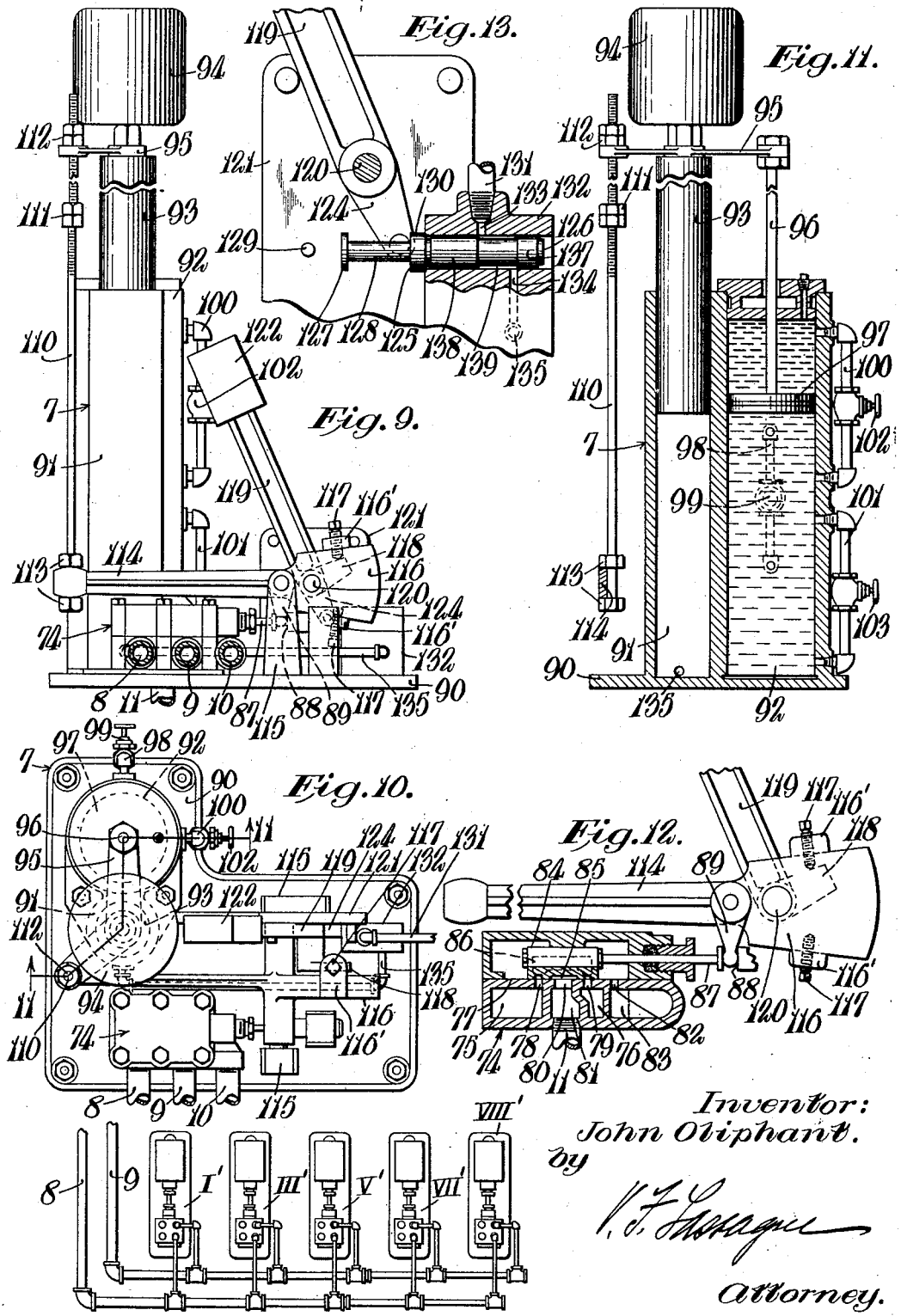

Patented May 10, 1932

1,857,393

UNITED STATES PATENT OFFICE

JOHN OLIPHANT, OF CHICAGO, ILLINOIS, ASSIGNOR TO SULLIVAN MACHINERY COMPANY, A CORPORATION OF MASSACHUSETTS

PUMPING MECHANISM

Original application filed March 24, 1924, Serial No. 701,569. Divided and this application filed March 12, 1925. Serial No. 15,095. Renewed November 10, 1930.

My invention relates to pumping mechanisms, and more particularly to pumping mechanisms especially adapted to use in cement making plants or other places where similar conditions are met.

In the making of cement the general process gone through consists in mixing ground lime stone with water, adding to this mixture clay, thoroughly mixing the same, passing the mixture through a wet grinder, and then causing it to pass through a kiln where the heat drives out the moisture and forms clinkers which are ground with potash as the final operation. It is obvious that it is highly important to the production of the best quality of cement that the mixtures at the various points in the process be uniform and this desideratum can only be secured by stirring the mixture in some manner. It will also be evident that the economical production of the cement will be greatly facilitated if the amount of liquid used to carry along the solid matter be kept at a minimum. It has been found in practice that the stirring can be very advantageously accomplished by means of spiders located at the bottom of suitable vats and discharging jets of air through numerous openings so that the thick fluid mixture or "slurry" is thoroughly stirred. It will be obvious that in a process such as has been described, the mixture of solid and liquid must be handled by some type of pumps a number of times and according to previous systems, where mechanical pumping devices were used, it was found that the specific gravity of the mixture could not be increased above a certain limit, or in other words that there was a certain minimum quantity of liquid per unit of solids which had to be employed, and moreover, when the very desirable aerating system of mixing was employed the pumps frequently lost their suctions so that difficulty was experienced in keeping the system in uniform operation.

My invention has for its object the provision of an improved pumping system which is especially adapted to processes of the type described, which permits the handling of a mixture of liquid and solid of a considerably higher specific gravity than was possible by any previous pumping system and which instead of being hindered in its effectiveness by the process of aeration used in maintaining the mixture uniform, fits in very desirably with this system and results in a considerable saving of power. Other objects and advantages of my invention will hereinafter more fully appear.

In the accompanying drawings I have shown for purposes of illustration one form which my invention may assume in practice.

In these drawings,—

Fig. 4 is a detail, partially in elevation and partially in section, showing one of the automatic check valves used in the system.

Fig. 5 is a central, vertical sectional view through a portion of the controlling mechanism.

Fig. 6 is a central sectional view through one of the check valves.

Fig. 7 is a view, partially in side elevation and partially in central vertical section through a trap or separator.

Fig. 8 is a section on a plane corresponding to line 8—8 of Fig. 7.

Fig. 9 is a side elevation of an automatic timing mechanism constituting the master switch or pilot mechanism.

Fig. 10 is a plan view thereof, together with the pilot valve mechanisms for the several pumps.

Fig. 11 is a section on planes corresponding to the broken line 11—11 of Fig. 10.

Fig. 12 is a detail sectional view through a valve mechanism forming a part of the pilot mechanism.

Fig. 13 is a another detail view.

This application is a division of my co-pending application filed Mar. 24, 1924, Ser. No. 701,569.

Figure 1:
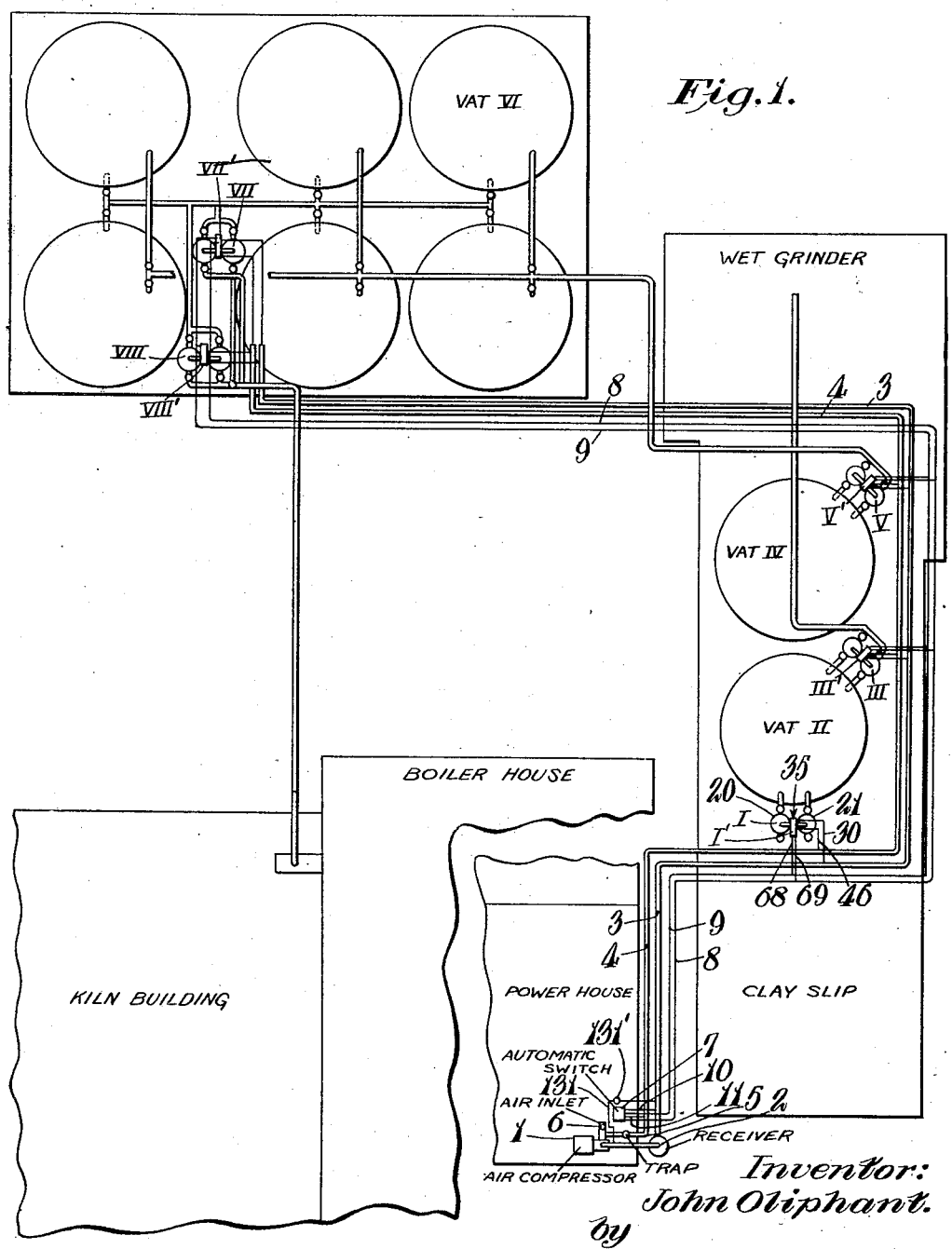
Fig. 1 is a diagrammatic view of the cement making plant in which the illustrative embodiment of my invention is incorporated.

In the system shown in Fig. 1 there will be noted to be disclosed a receptacle consisting of a concrete basin and designated a clay slip in which there is added to a mixture of ground lime stone and water, a suitable quantity of clay. From this clay slip a set of displacement pumps designated I draws this mixture and discharges it into a vat designated II. A second pair of displacement pumps III pumps the mixture from this vat II into a wet grinder, so designated in Fig. 1, from which it is discharged by gravity after grinding into vat IV. From this a third pair of displacement pumps V takes it and discharges it into the storage vats VI through any suitable system of distribution piping, permitting the liquid to be distributed to any one of a number of vats which may be selected. From these storage vats two more sets of displacement pumps VII and VIII take the fluid mixture and discharge it into a kiln, either of these sets of pumps being operative or both working together as may be desired. It is to be understood that pairs of displacement pumps are used so that a more continuous process may be accomplished, one displacement tank or pump discharging while the other is filling and vice versa. It will be understood that in the drawings the aerating system for mixing the contents of the various vats has not been shown as this is itself not my invention, but it will be understood that means is provided and forms a part of the plant whereby the contents of the vats are stirred by the admission of jets of air which is preferably supplied through rotating spiders.

Now considering the pumping system in greater detail, it will be observed that a compressor 1 is shown discharging air to a receiver 2. From the receiver a line 3 leads off which is the pressure line and this pressure line extends adjacent to each one of the several displacement pumping outfits I, III, V, VII, and VIII. A parallel pipe line 4 which constitutes the suction pipe line is similarly extended and leads through a trap or separator 5 to the suction side of the compressor, suitable automatic air inlet means 6 being provided to admit air to the compressor at such times as the pressure in the suction line is below a predetermined sub-atmospheric pressure. It is to be observed, however, that with this system, after the system has once been placed in operation the automatic air inlet practically never operates and there may be a surplus of air for use elsewhere. The reason for this will hereinafter appear.

A timing switch generally designated 7 and which is the invention in its form illustrated of one Wade H. Wineman, and which constitutes an improvement upon a similar mechanism invented by one David H. Hunter, alternately connects a pair of lines 8 and 9 with the pipe lines 3 and 4 through connections 10 and 11. The construction of this timing mechanism, while per se constituting no part of my invention, will be more fully explained hereafter, but for the present it will be sufficient to state that it includes automatically operating means for supplying pressure to the pipe 8 while connecting the pipe 9 to the suction side of the compressor or vice versa.

Now observing the mechanism so far described in greater detail before proceeding to a further description of the features of the system, it will be noted that the trap or separator 5, which may obviously assume other forms, therein comprises a vertically disposed casing 15 whose interior is divided throughout the greater portion of its length into two chambers which do not communicate with each other except adjacent the bottom, this division being effected by a septum 16 extending diametrically in the casing and contacting at its upper end with the cover 17 of the casing. At the bottom of the casing 15 there is arranged an outwardly opening check valve 18. It will be noted that when the pressure within the trap or separator is less than atmospheric, this valve will be held closed unless there be a considerable pressure due to high liquid level tending to force it open, a condition not likely to occur in practice. In the normal operation of the system there is at intervals a considerable quantity of air under pressure discharged into the line 4 from the tanks which have been emptied and during such periods as the pressure in the line 4 is above atmospheric the valve 18 will open and allow liquid to discharge. When the pressure in the line is pumped down, the valve will be closed. By suitably throttling the outlet beyond the valve 18 in any manner by suitable means not shown, for example an ordinary stop valve, some liquid is always maintained in the trap or separator.

Figure 2:
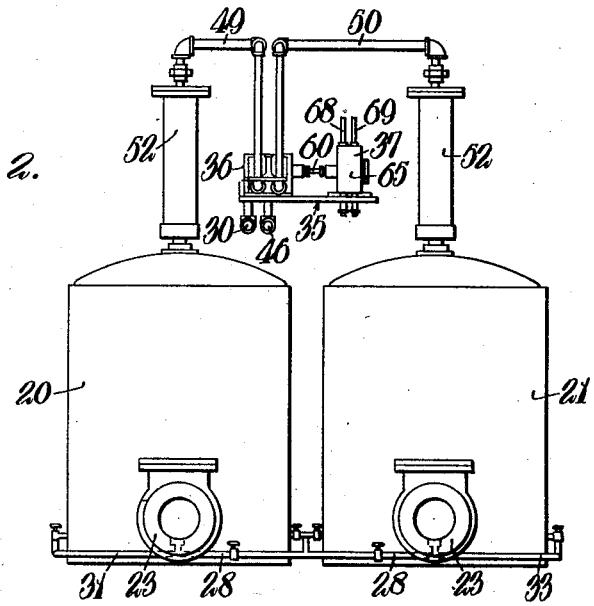
Fig. 2 is a side elevation of a pair of the displacement tanks and their controlling mechanism used in such a system.
Figure 3:
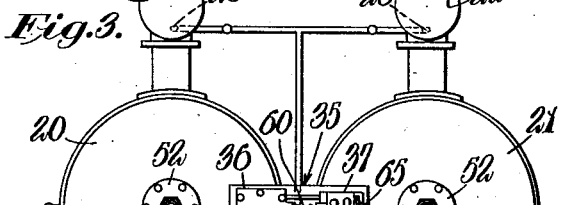
Fig. 3 is a plan view showing the same mechanism together with additional piping used.

The various pumping units I, III, V, VII, and VIII are all substantially alike and accordingly the description of one will suffice for all. Noting particularly Figs. 2, 3, 4, 5, and 6, in which one of these units is shown, together with certain of the details of its construction, it will be observed that each unit comprises a pair of tanks, herein vertical tanks 20 and 21. At opposite sides of each tank there are arranged check valve housings 22 and 23 of which one is an inlet check valve and the other a discharge valve. The internal construction of these valves may be observed from Fig. 6 from which it will be noted that they each comprise a casing 24 provided with a septum 25 on which is mounted a seat portion 26 upon which a ball 27 is adapted to seat. Connections 28 are provided for the admission of jets of air to the casings to clean them out in the event that they tend to become choked or clogged. Noting Figs. 2 and 3 again it will be observed that from the line 3, a pipe connection 30 leads off which is tapped by a piping system including four pipes 31, 32, 33, and 34 which are suitably valve controlled and which in the cases of pipes 32 and 34 serve for the supply of fluid to the blow out connections 28 while the pipes 31 and 33 which are also valved serve to conduct fluid to blow out the bottom of the tanks at suitable times so as to prevent the bottom of the tanks becoming filled with sediment or precipitated solid matter. Mounted above the tanks and between them is a pilot valve mechanism generally designated 35 and comprising pilot valve mechanism proper 36 and a servo-motor 37 therefor. Noting Fig. 5, it will be observed that the pilot valve mechanism 36 includes a valve chest in which a seat 39 is formed, upon which seat a valve 40 is movable, this valve being of the D slide valve type, but having opening through its bottom adjacent the opposite ends thereof a U-shaped port or passageway 41. The line 30 leading from the pipe 3 opens into a chamber 42 which communicates through a port 44 with the chamber in which the valve 40 is reciprocable. A port 45 opening through the seat leads to a pipe 46 which is connected as shown in Fig. 3 with the suction line 4. A pair of ports 47 and 48 also traverse the valve seat at opposite sides of the port 45 and these communicate respectively with pipes 49 and 50. Between the pipes 49 and 50 and their respective tanks 20 and 21 there are arranged float check valve mechanisms each comprising a casing 52 in which a float 53 is guided, this float carrying at its top a hemisphere 54 adapted to cooperate with a valve seat 55 and prevent the fluid in the tanks from passing into the lines 49 and 50 while the latter are connected to suction. The valve 40 is actuated by a valve stem 60 connected thereto and also connected to a piston 61 reciprocable in a cylindrical bore 62 formed in a member 63 supported by a partition 64 dividing a casing 65 into two chambers, numbered respectively 66 and 67. The chambers 66 and 67 are connected by lines 68 and 69 respectively to the lines 9 and 8. It will be observed that manually adjustable valves 70 and 71 are arranged in the lines 68 and 69 and that a manually adjustable valve 72 is arranged in the line 30. As a result of this construction it will be observed that when the line 8 is connected to the line 3 and the line 9 connected to the line 4 by the main pilot valve mechanism, the piston 61 will be moved to the left while when the pipes 8 and 9 are reversed as to their connections to the lines 3 and 4, the piston 61 will be moved in an opposite direction. It should be noted that the chambers 66 and 67 contain liquids to such depths as to prevent the possibility of air directly blowing through from one side to the other of the piston 61. When the piston 61 is moved to the left, fluid pressure, herein air, will pass through the line 3, pipe 30, chamber 42, port 44, and port 48, to the pipe 50 to empty the tank 21, while the tank 20 will be connected with the suction line 4 by way of pipe 46, port 45, the groove in the bottom of the valve, port 47, pipe 49 and the check valve casing 52. As the piston 61 crosses its mid position it will cause the inter connection of the ports 47 and 48 and so economy in air consumed will result from the bypassing of air under pressure from the empty tank to the tank which is about to be emptied. It will be observed from Fig. 10 the lower portion of the figure, that the pilot valve mechanisms for the pumps I, III, V, VII and VIII, which are in that figure designated respectively I′, III′, V′, VII′, and VIII′, are all arranged in such manner that the lines 3 and 4 are alternately connected to the opposite sides of the piston 61 in each of the several pilot valve mechanisms at once. For the purpose of preventing one of the tanks from emptying more rapidly than the other, it will be obvious that it is readily possible by adjusting the valve 72 to control the rate of fluid supply to the individual valve mechanisms through which air is distributed to the tanks and by adjusting the valves 70 and 71 the rate of movement of the pistons 61 may be controlled in such manner as to provide the desired periods of intercommunication between the tanks of each series.

The construction and the mode of operation of the main pilot switch may now be described, although as stated above, this particular mechanism per se is not my personal invention. It will be noted that the lines 8 and 9 are connected to a valve chest 74, herein respectively connecting to chambers 75 and 76 below a valve seat 77 in the valve chest. The valve seat 77 is traversed by a series of ports 78 and 79 leading to the chambers 75 and 76, a central port 80 leading to a chamber 81 connected to the line 11 and a port 82 opening into a chamber 83 to which the line 10 leads. Reciprocable in the valve chest 74 and upon the valve seat 77 is a slide valve 84 having a recess 85 formed therein which is adapted alternately to connect the ports 78 and 79 with the port 80 and the valve 84 with its outer edge controls the communications of chambers 75 and 76 with the supply of pumping fluid which enters the chest through port 82. The valve 84 is provided with a bypass passage 86 which is adapted in mid-position of the valve as shown in Fig. 12 to interconnect the ports 78 and 79 and so to permit equalization of pressure in the lines 8 and 9 as the valve shifts its position, thereby effecting a further economy in air. The valve 84 is provided with a valve stem 87 having an annular groove 88 therein with which the extremity of a lever 89 cooperates on actuation of the latter, in a manner which will shortly be described. The valve chest 74 is supported on a base plate 90 upon which there are arranged in parallel relation to each other a pair of cylinders 91 and 92. Within the cylinder 91 a piston 93 is reciprocable. This piston at its upper end carries a relatively heavy weight 94 which aids in returning the piston 93 to the bottom of the cylinder 91. Movable with the piston 93 is a cross head 95 to which a piston rod 96 is connected and at the lower end of this piston rod is a piston 97 which is reciprocable in the cylinder 92. The cylinder 92 is filled with oil nearly to its top and communicating with the bore of the cylinder at points spaced above and below the mid position of the piston 97 is a bypass 98 which is controlled by a stop valve 99. It will be evident that the stop valve 99 if nearly closed will render the movement of the piston relatively quite slow during mid-travel while if it be opened to a considerable extent fairly rapid movement of the piston 97 will be permitted. Other valve controlled bypasses 100 and 101 communicate with the bore of the cylinder 92 respectively near the top of the latter and at a point somewhat below the upper communication with the cylinder bore of the bypass 98, and at a point adjacent the bottom of the cylinder and at a point somewhat above the lower communication of the bypass 98. The function of these last mentioned bypasses 100 and 101 which are respectively controlled by valves 102 and 103 is to vary the rate of movement of the valve 84, the bypass 98 and the valve 99, exercising no control on the rate of movement of the valve, but varying the intervals between movements as hereinafter explained. The cross head 95 is adapted to actuate an operating rod 110 upon which there are mounted stops 111 and 112 relative to which the cross head moves and adapted to be engaged by the cross head at appropriate times. At its lower end the operating rod 110 carries a pair of spaced nuts 113 which engage the opposite sides of an operating lever 114 and move the same when the rod 110 is moved. The lever 114 is a bell crank lever and the lever arm 89 previously referred to constitutes one arm thereof. The bell crank lever 114 is journaled in bearings 115. The lever 114 also carries therewith a flat relatively broad projection 116 at whose opposite sides there are arranged bosses 116′ carrying screws 117 which project towards each other and are adapted alternately to engage the arm 118 of a bell crank lever 119 which is pivoted on a stub shaft 120 projecting from a bearing supporting member 121 upon which the other bearing 115 is also carried. The bell crank lever 119 at its upper end carries a weight 122 oscillating with the bell crank lever 119 and herein cast integral therewith. In alinement with the weight carrying portion thereof is a lever portion 124 whose lower extremity is adapted alternately to engage the end 125 of a valve member 126 or a collar 127 which is rigidly carried on the stem 128 of the valve 126. A pin 129 is arranged to limit the movement of the valve 126 toward the left (see Fig. 13) while an enlarged portion or collar 130 of the valve 126 limits its movement in the opposite direction. A connection 131 controlled by an adjustable pressure reducing valve 131′ is supplied with air from the compressor discharge line and communicates with the valve chest 132 in which the valve 126 is reciprocable by way of a port 133. A passage 134 also communicates with the valve chest at a spaced point and this passage leads at 135 to the bottom of the interior of the cylinder 91. The valve 126 is of the two spool type having spools 137 and 138 spaced by an intermediate groove 139. The spool 137 is proportioned so that in one position of the valve it lies to the right of the passage 134, while in the other position it lies wholly to the left of this passage. As a result, in one extreme position of the valve 126 the inlet port 133 is connected to the port 134 by the groove 139 while in the other extreme position the port 134 opens to the atmosphere. By adjustment of the pressure reducing valve 131′ the air supply beneath the piston 93 may be regulated and so the time of upward movement of the piston varied. It will be observed that by adjusting the reducing valve 131′ and the choke valve 99 the speeds of the upward and downward movements of the piston 97 may be varied almost as desired.

From the foregoing description the mode of operation of this main pilot switch and the timing mechanism will be readily apparent. It will be noted that the piston 93 is moving upward. As soon as it has moved sufficiently far for the lever 114 to cause the screw 117 to tilt the lever 118 to such an extent that the weight 122 passes through its vertical position the lever 119 will be swung sharply to its extreme right hand position and as a result the position of the valve 126 will be changed and the cylinder 91 vented, whereupon the weight 94 will cause the parts to begin to move downward. It will be observed that before this reversal of the movement takes place, the lever 114 will have been moved to such an extent that the arm 89 will have shoved the valve 84 so far to the left that the passage 78 and with it the line 9 will have been connected to the suction line 4 through pipe 11 while the port 79 and with it the line 8 will be connected with the supply of live pressure fluid from line 3 through pipe 10 and port 82. During a substantial part of the downward movement of the pistons 93 and 97 the valve 84 will remain stationary, the duration of this stationary period being controllable by the adjustment of the valve 99, but as the pistons near their lowermost position the cross head 95 will engage the nut 111 and shift the lever 114 in the opposite direction which will gradually move the valve 84 to the right, interconnecting the passages 8 and 9 and which will finally cause another sharp reversal of the position of the valve 126. As the passages 8 and 9 are alternately connected to the supply line 3 and to the suction line 4 through the pipes 10 and 11, it will be observed that each of the pistons 61 will be moved successively in opposite directions, resulting in reversals in position of the valves 40; and by reason of the construction of these valve and their valve chests, it will be observed that between the periods of filling and emptying of the individual tanks 20 and 21 of each of the pumping units, there will take place a period of intercommunication between the empty and full tanks, so that there will be economy of air to the maximum possible degree.

By reason of the fact that the aerating or stirring gaseous fluid tends to become entrained in the slurry which has to be handled by the pumps, it will be apparent that a certain quantity of air will be admitted to the displacement pump tanks with each charge of liquid that is received and this air will tend to be separated during the filling period of the tanks by reason of the fact that these tanks are then under a partial vacuum. Accordingly, the slurry moving system will not have to take in new air through the automatic relief valve 6, but will generally during normal operation of the system be provided with an adequate quantity of this entrained air to maintain the system filled despite any ordinary leakage. It will be observed, moreover, that this entraining of the air in the slurry does no harm in the operation of the system while, were some type of displacement pump, for example, to be employed or even a centrifugal pump, a loss of suction would be met with at frequent intervals due to the pump becoming air bound and then it would be necessary to prime the pumps in some manner. It is also to be noted, and this is a most important feature, that a liquid of a very substantially greater degree of viscosity can be handled than by any other type of pumping system and accordingly a very great saving in the amount of coal, oil or other fuel that has to be used in heating the kilns is accomplished. It has been noted that all danger of the carrying over into the suction line of the slurry is minimized by the use of the check valves 54, while any access of slurry to the compressor cylinder is moreover absolutely precluded by the automatic separator and drain trap 5. It will be observed that in connection with the pumping system described, means is provided for blowing out the check valve chambers and stirring up the contents of the displacement tanks at suitable intervals so as to prevent their becoming clogged by the solid matter settling out of the solution. From this it will be deduced that I have provided a pumping mechanism especially adapted to use with mixtures of liquid and solid which are stirred by aeration to keep the solid in suspension and to effect a proper mixing of the constituents and that I have provided a pumping system which irrespective of the method of mixing employed is capable of handling a mixture of liquid and solid of greater viscosity than any other known type of pumping system.

To summarize briefly some of the improved features of this mechanism, it is to be observed that there are no moving parts working in contact with the material to be handled except the inlet and discharge valves. This is obviously a considerable advantage as compared with centrifugal pumps, for example, where the blades would wear due to the action of the material pumped upon them and would be an even greater advantage over cylinder and piston type pumps where the wear would tend to be even greater. As a result, there is a sustained efficiency with my improved mechanism not secured with other methods of pumping. A further improvement resides in the fact that the various pumping units are all handled from a central prime mover, namely, the compressor, while the capacity of each is controlled by an air valve adjacent thereto. In other words, there is no need for a separate operating motor for each pumping unit with a separate control individual thereto. It has been pointed out that the slurry handled by these pumping units is constantly aerated during the stirring processes in the tanks. By reason of the fact that a considerable quantity of this air tends to remain in the fluid material handled there would be considerable difficulty due to loss of suction, etc., were either the centrifugal or reciprocating types of pumps used. No trouble, however, is encountered with the present mechanism and in fact the presence of this air is in nowise disadvantageous to the operation of the entire system.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a pair of displacement tanks, a compressor, pressure and suction lines respectively connected with the discharge and intake of said compressor, valve means for connecting one of said lines to one of said tanks, and the other to the other and vice versa, and a trap between said tanks and said compressor in said suction line provided with means for automatically venting the same on each reversal of the connection to said tanks.

2. In a displacement pumping system, a plurality of displacement pumping units, means for subjecting a portion of said units to pressure and the remainder to suction and vice versa including a fluid supply line and a suction line, means for precluding passage of liquid from said units to said suction line, a compressor discharging to said fluid supply line and having its intake connected to said suction line, and a separator in said suction line between said compressor intake and said pumping units for venting liquid therefrom while preventing the admission of air thereto.

3. In a displacement pumping system, a plurality of displacement pumping units, means for subjecting a portion of said units to pressure and the remainder to suction and vice versa including a fluid supply line and a suction line, means for precluding passage of liquid from said units to said suction line, a compressor discharging to said first mentioned line and having its intake connected to said second line, and an automatically vented separator in said suction line between said compressor intake and said pumping units for venting liquid therefrom while preventing the admission of air thereto.

4. In a pumping system, a compressor, a line connected to the discharge side thereof, a line connected to the suction side thereof, a plurality of pairs of displacement tanks, valve means associated with each pair of tanks for connecting one of each pair of said tanks to one of said lines and the other of each pair of said tanks to the other of said lines, for connecting said tanks of each pair together, and for connecting them in opposite relation to that first described, controlling means for said valve means including a servo-motor for the valve means of each pair including a movable element operatively connected to its valve means, and common means for supplying fluid to one end of all of said movable elements while venting the other, and vice versa, and also operative to interconnect the two sides of said elements.

5. In a displacement pump, a displacement tank having supply and discharge connections, check valves controlling said connections, means for supplying and exhausting fluid relative to said tank, and means for supplying fluid under pressure to said check valves and to the bottom of said tank.

6. In combination, a displacement tank, a pump, pressure and suction lines respectively connected with the pump discharge and pump intake, and means for selectively connecting said tank with said lines, said suction line being provided with a trap having means for automatically venting it at each connection of said tank to the suction line.

7. In combination, a displacement tank, a pump, pressure and suction lines respectively connected with the pump discharge and pump intake, and means for selectively connecting said tank with said lines, said suction line being provided with a trap having means controlled by the pressure conditions in said trap for automatically venting the latter at each connection of said tank to the suction line.

8. In combination, a pair of displacement tanks, a pump having suction and discharge connections, and means for connecting one of said tanks with said suction connection and the other with the pump discharge, and vice versa, including means to prevent liquid being carried over from a displacement tank to the pump comprising means to prevent flow of liquid from the tank towards the pump suction and means in the pump suction connection for permitting automatic discharge of any liquid which might pass said last mentioned means.

9. In combination, a displacement tank, a pump having suction and discharge connections, and means for connecting said tank alternatively with said suction connection and with said discharge connection including a plurality of means in series, one of which is in the suction connection, for preventing liquid being carried over from the displacement tank to the pump.

10. In combination, a pair of displacement tanks, a pump having suction and discharge connections, and means for connecting one of said tanks with said suction connection and the other with the pump discharge and vice versa including a plurality of means in series, one of which is common to the operation of both tanks, for preventing liquid being carried over from the displacement tanks to the pump.

In testimony whereof I affix my signature.

JOHN OLIPHANT.